United States Patent [19]

Koizumi et al.

[11] Patent Number: 5,594,350
[45] Date of Patent: Jan. 14, 1997

[54] SIGNAL DETECTING CIRCUIT FOR DIGITAL CONTROLLER

[75] Inventors: Yutaka Koizumi; Minoru Banjo; Takeshi Wakugawa, all of Hitachi, Japan

[73] Assignees: Hitachi, Ltd., Tokyo; Hitachi Electric System Company, Ltd., Hitachi, both of Japan

[21] Appl. No.: 347,635

[22] Filed: Dec. 1, 1994

[30] Foreign Application Priority Data

Dec. 9, 1993 [JP] Japan .................................. 5-308968

[51] Int. Cl.⁶ .................................................. G01R 27/28
[52] U.S. Cl. ........................... 324/616; 324/771; 324/772; 324/76.39; 327/90; 327/113
[58] Field of Search ............................ 324/76.39, 615, 324/616, 617, 537, 771, 772; 327/90, 113, 552

[56] References Cited

U.S. PATENT DOCUMENTS

| | | | |
|---|---|---|---|
| 4,741,023 | 4/1988 | Lawson | 324/771 X |
| 5,097,219 | 3/1992 | Itoh | 327/113 |
| 5,132,633 | 7/1992 | Wong et al. | 327/113 |
| 5,391,982 | 2/1995 | Kim | 324/76.39 |
| 5,394,025 | 2/1995 | Pierson | 327/530 |

FOREIGN PATENT DOCUMENTS

| | | |
|---|---|---|
| 0523586 | 1/1993 | European Pat. Off. . |
| 63-305715A | 12/1988 | Japan . |
| 3-56034 | 3/1991 | Japan . |
| 3-239113 | 10/1991 | Japan . |
| 3-245715 | 11/1991 | Japan . |
| 4213A | 1/1992 | Japan . |
| 5-252647 | 9/1993 | Japan . |

*Primary Examiner*—Kenneth A. Wieder
*Assistant Examiner*—Glenn W. Brown
*Attorney, Agent, or Firm*—Kenyon & Kenyon

[57] ABSTRACT

An instantaneous value of alternating current signal from an instrument potential transformer 10 or an instrument current transformer 9 is processed with an analog filter 21, 22, the frequency to be used for correction being detected with a frequency detector 103, frequency correction of the gain of the detected signal being performed with a frequency corrector 104, 114 after detecting the root-mean-square value of the frequency, the corrected signal being supplied to a digital automatic voltage regulator 120. Thereby, it is possible to remove a direct current component and absorb a surge in a signal, and to correct the signal in coping with the fluctuation of the input signal to detect a stable signal.

6 Claims, 3 Drawing Sheets

5,594,350

1

SIGNAL DETECTING CIRCUIT FOR DIGITAL CONTROLLER

BACKGROUND OF THE INVENTION

1. Field of the Invention

The present invention relates to a signal detecting circuit for a digital controller detecting a signal having a quantity corresponding to the state of the system (also referred to as a quantity of state) necessary for control from a signal detecting circuit in a digital controller such as an exciter for a synchronous machine or automatic voltage regulator, particularly from an instantaneous value of alternating current signal.

2. Description of the Related Art

A digital controller performs control by receiving an instantaneous value of alternating current from an instrument potential transformer or an instrument current transformer and detecting quantity of state necessary for control.

In the past, detection of the control signal has been performed totally by digital processing including removing a direct current component in the signal and a surge component at occurrence of an electric power system accident, as described in, for example, Japanese Patent Application Laid-Open No.63-305725 (1988). However, removing of the direct current component and the surge has been not sufficient. And another method is known in which the direct current component and the surge are absorbed by providing an analog filter as described in Japanese Patent Application Laid-Open No.4-213 (1992).

In the conventional methods described above, even when the signal has the direct current component and the surge at occurrence of an electric power system accident, the signal is detected in the same way as a normal state. Thereby, there is a disadvantage in that the control becomes instable. Therefore, it has been considered to solve this problem by providing an analog filter for removing the direct current component and absorbing the surge.

SUMMARY OF THE INVENTION

However, it has been revealed that there arises a new problem that the signal to be detected is attenuated due to the attachment of the analog filter.

An object of the present invention is to solve the problem caused by attaching said analog filter. The present invention is basically characterized by solving the aforementioned problem by performing gain correction and phase correction using frequency.

The main object of the present invention can be attained by providing an analog filter for removing the direct current component and absorbing the surges to remove the direct current component and the surge contained in a control signal, and by providing frequency correcting means for detecting the frequency (f) of the detected signal passed through the analog filter and for performing frequency (f) correction to the root-mean-square vale of the instantaneous value of alternating current by detecting the frequency (f) of the detected signal passed through the analog filter in order to make up for the attenuation of the detected signal caused by passing the analog filter.

The analog filter absorbs the surges using a lag transfer function. Therefore, the object of the present invention can be attained by providing means for correcting phase delay by using leading transfer function to correct the phase delay produced by that time.

2

It is difficult to detect frequency accurately when the instrument potential transformer or the instrument current transformer signal level is small. Therefore, the further object of the present invention can be attained by providing means for performing a frequency correction equivalent to the standard electric power system frequency (50 Hz or 60 Hz) when the input signal level from the instrument potential transformer or the instrument current transformer is smaller than a given value and by correcting frequency depending on the detected frequency when the input signal level from the instrument potential transformer or the instrument current transformer is larger than the given value.

Further, since frequency fluctuation hardly occurs when a generator is connected to the electric power system, a frequency limiter (for example, 50 Hz±2 Hz) is provided in the downstream of the frequency detecting circuit to limit an excessive frequency gain correction in an electric power system connecting condition such as a closing state of a circuit beaker 13 (commonly called a 52G) in which the generator is connected to the electric power system.

With this means, it is possible to prevent an abnormal frequency correction due to an unbalance electric power system accident or a frequency abnormality in the detecting circuit or one-phase line break.

When signal is detected directly using the instantaneous value of alternating current from an instrument potential transformer or an instrument current transformer, the direct current component and the surge in the signal are removed by providing an analog filter. However, the detected signal wave form is attenuated and the phase delay occurs due to passing through the analog filter.

The attenuation of the detected signal wave can be corrected through a gain correction using the frequency (f).

And as to the phase delay due to using an analog filter, the phase delay can be corrected by adding a leading transfer function.

Further, an abnormal gain correction and an abnormal phase correction due to the state of the frequency can be prevented by adding a limit to the output value from the frequency (f) detecting circuit depending on the state of connecting operation with the electric power system.

DETAILED DESCRIPTION

An embodiment of a digital automatic voltage regulator according to the present invention will be described below.

Figure 1:
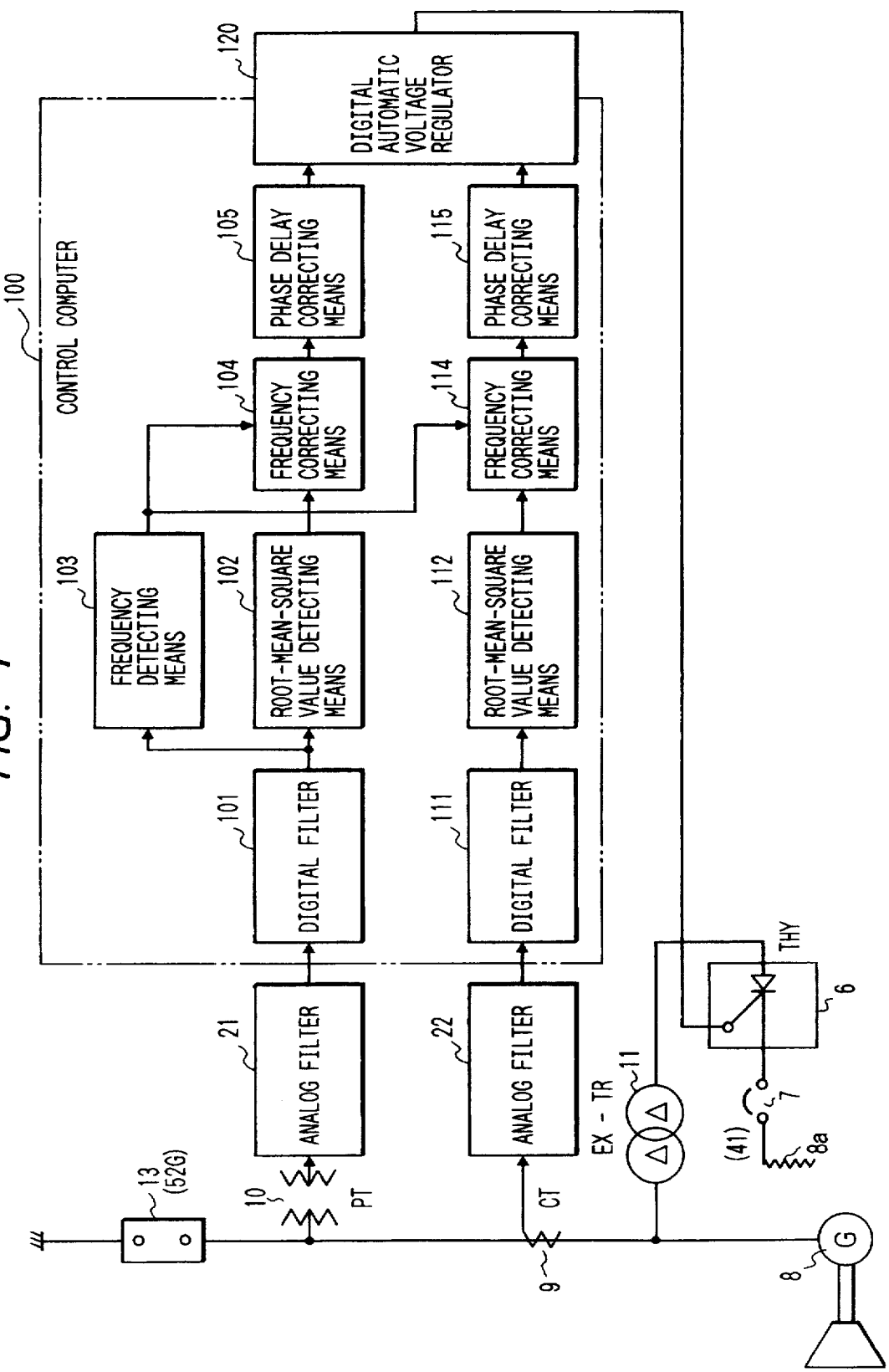
FIG. 1 is a diagram showing the circuit construction of an embodiment in accordance with the present invention.

As shown in FIG. 1, the terminal voltage and the terminal current of a generator (G) 8 are picked up using an instrument potential transformer (PT) 10 and an instrument current transformer (CT) 9, and fed to the digital automatic voltage regulator through analog filters 21, 22 and a control computer 100. The control computer 100 constructs, using a processing program digital filters 101,111, root-mean-square value detecting means 102, 112, frequency (f) detecting means 103, frequency correcting means 104, 114, phase delay correcting means 105, 115, and a part of the digital automatic voltage regulator 120. And the control computer processes the input signal and outputs the signal to the digital automatic voltage regulator 120 as a detected signal. The digital automatic voltage regulator 120 compares the input signal with a set value preset in advance, putting out a signal corresponding to the difference, controlling the terminal voltage of the generator (G) 8 to be constant by varying the exciting current of the generator 8 by varying the firing angle of a thyristor (THY) 6. An excitation transformer (EX-TR) 11 is connected between the generator 8 and the thyristor 6, a field circuit breaker (commonly called a 41: field-discharge circuit breaker) 7 is connected between the thyristor 6 and an excitation coil 8a.

The instrument potential transformer 10, the instrument current transformer 9, the analog filters 21, 22 in the signal detecting circuit in the apparatus, the root-mean-square value detecting means 102, 112, the frequency detecting means 103, the frequency correcting means 104, 114, and the phase delay correcting means 105, 115 will be described below.

The terminal voltage and the terminal current of the generator 8 are picked up by the instrument potential transformer 10 and the instrument current transformer 9 in the form of the instantaneous value of alternating current, the analog filter 21 removing the direct current component and absorbing the surges, detections being performed by the frequency detecting means 103 and the root-mean-square value detecting means 102, 112. The frequency correcting means 104, 114 perform a gain correction of the root-mean-square value detected by the root-mean-square value detecting means 102, 112 against the instantaneous value of alternating current using the frequency detected by the frequency detected means 103.

The phase delay correcting means 105, 115 correct phase delay caused by the analog filters 21, 22 to input the detected signal, without time lag, to the digital automatic voltage regulator 120 so that a stable automatic voltage regulation control can be performed.

Figure 2:
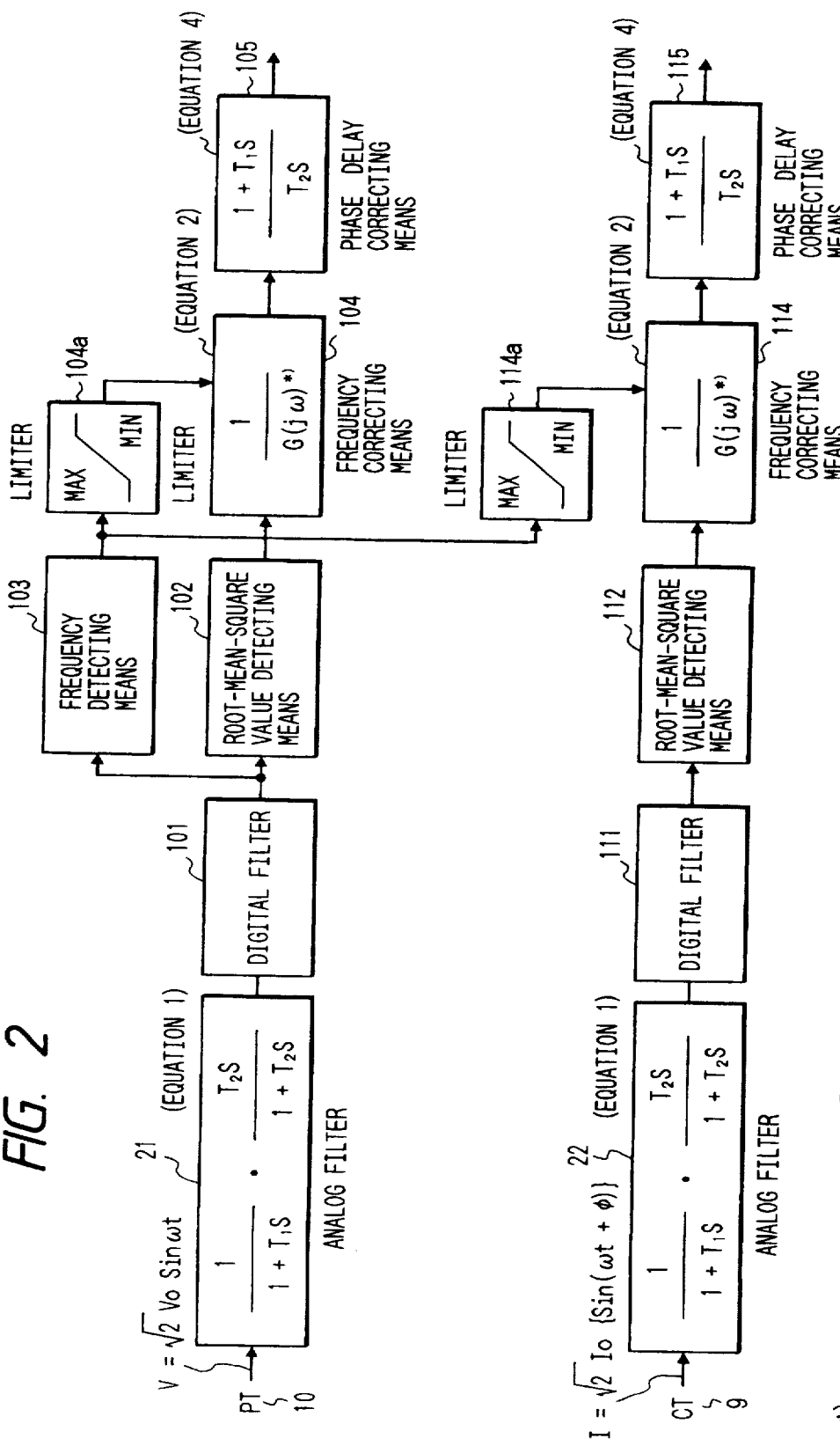
FIG. 2 is a block diagram showing the functional construction of the above embodiment in accordance with the present invention.

FIG. 2 is a detailed block diagram showing the detailed processing function of the embodiments of FIG. 1. The transfer functions for the analog filters 21, 22, the frequency correcting means 104, 114 and the phase delay correcting means 105, 115 will be described below.

1) The transfer function of the analog filters 21, 22 can be expressed by Equation 1.

$$\frac{1}{1+T_1 S} \cdot \frac{T_2 S}{1+T_2 S} \quad \text{(Equation 1)}$$

2) The transfer functions for the frequency correcting means 104, 114 are expressed by Equation 2 and Equation 3.

$$\frac{1}{G(j\omega)} \quad \text{(Equation 2)}$$

$$G(j\omega) = \frac{\omega T_2}{\sqrt{1+(\omega T_1)^2} \cdot \sqrt{1+(\omega T_2)^2}} \quad \text{(Equation 3)}$$

3) The transfer function for the phase delay correcting means 105, 115 is expressed by Equation 4.

$$\frac{1+T_1 S}{1+T_2 S} \quad \text{(equation 4)}$$

Therein, the frequency correcting means 104, 114 are added with limiters 104a, 114a. When the generator 8 is connected to the electric power system, fluctuation in frequency hardly occurs. Therefore, the limiters 104a, 114a (for example, 50 Hz±2 Hz limiting circuit) operate under a condition of connecting to the electric power system such as under a closing state of the circuit breaker (commonly called a 52G) 13 to limit an excessive gain correction due to the fluctuation of the frequency.

Thereby, it is possible to prevent an abnormal gain correction due to an unbalance electric power system accident, a frequency abnormality of the detecting circuit, or one-phase line break in the three-phase input signals of the instrument potential transformer 10.

Figure 3:
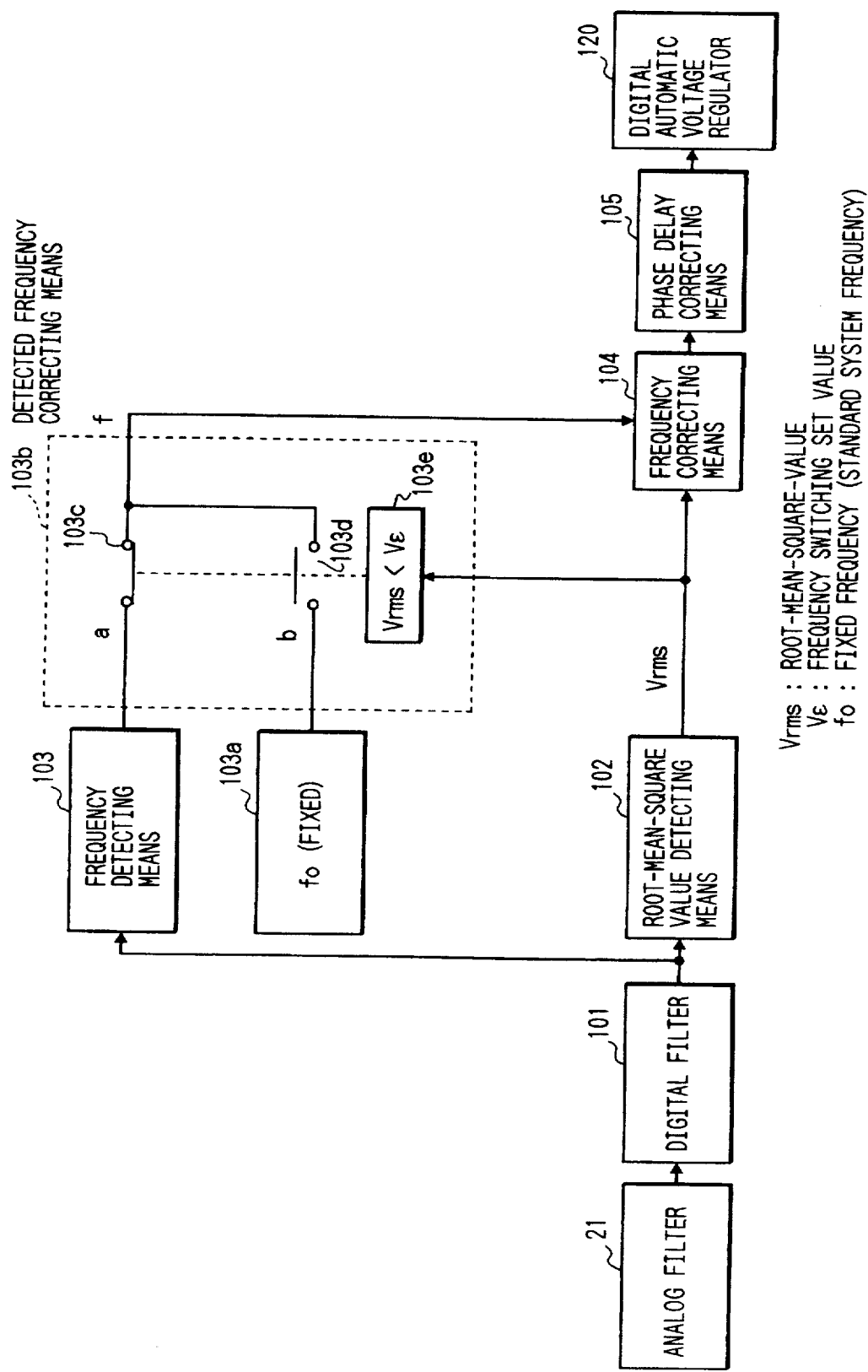
FIG. 3 is a diagram showing the circuit construction of another embodiment in accordance with the present invention.

There are some cases where it is difficult to detect the frequency detection correctly when the signal level of the instrument potential transformer 10 or instrument current transformer 9 in the embodiment is small. Therefore, it is possible as a countermeasure to employ such a construction that the frequency correcting means 104, 114 perform a correction using a fixed value of a standard electric power system frequency (50 Hz or 60 Hz) when the level of the input signal from the instrument potential transformer 10 or the instrument current transformer 9 is smaller than a certain value, and the frequency correcting means 104, 114 perform an automatic gain correction depending on the change in the frequency using the frequency detected by the frequency detecting means 103 when the level of the input signal from the instrument potential transformer 10 or the instrument current transformer 9 is larger than the certain value. FIG. 3 shows an embodiment of the construction in which only the voltage signal system is illustrated as the typical one.

In FIG. 3, an $f_0$ fixed frequency (standard electric power system frequency) generating means 103a is provided in addition to the frequency detected means 103 to input the outputs of the frequency detecting means 103 and the $f_0$ fixed frequency generating means 103a to a detected frequency correcting means 103b. The detected frequency correcting means 103b is composed of a judging switch 103e and switching contact points 103c, 103d for the detected signal. The judging switch 103e compares the root-mean-square value $V_{rms}$ of the detected signal with a set value $V_\epsilon$ and performs switching such as to open the normally closed contact point 103c and close the normally open contact point 103d when the root-mean-square value is smaller than the set value ($V_{rms} < V_\epsilon$). In this case, the frequency correcting means 104 performs the correction equivalent to the standard electric power system frequency of the $f_0$ fixed frequency generating means 103a. When $V_{rms} > V_\epsilon$, the frequency correcting means 104 performs the automatic gain correction corresponding to the detected frequency using the signal from the frequency detecting means 103 through the normally closing contact point 103c. The detected signal corrected is supplied to the digital automatic voltage regulator 120 through the phase delay correcting means.

Although the case in FIG. 3 has only one system of the signal detecting circuit, it is possible to apply the same circuit to a case where two systems of the signal detecting circuits using an instrument potential transformer and an instrument current transformer are employed.

According to the present invention, by using analog filters for the instrument potential transformer and/or instrument current transformer signal detection, the direct current component can be removed and the surge can be absorbed to obtain a stable control input signal.

Since the frequency (f) is detected from the detected signal passed through the analog filter and the frequency (f) correction is automatically performed corresponding to the change of said detected frequency by using the root-mean-square value of the instantaneous value of alternating current of the detected signal, it is possible to correct the signal attenuated by passing through the analog filter. And since the phase delay in the signal having phase delay due to passing through the analog filter can be corrected, it is possible to cope with the change in input signal and consequently to detect a stable signal.

Further, when the input signal from the instrument potential transformer or the instrument current transformer is zero, the frequency (f) used for correction becomes zero, that is, ω=0 and consequently zero-dividing occurs to cause a failure of the apparatus. By setting a condition to perform an automatic correction of frequency and using a fixed correcting value if the condition is satisfied, the zero-dividing can be prevented.

Furthermore, by providing a limiter in the down-stream of the frequency detector to operate in the closing state of the circuit breaker (commonly called a 52G) where the generator is connected to the electric power system, an abrupt frequency fluctuation at an abnormal input can be prevented and consequently the trip of the generator can be prevented.

What is claimed is:

1. A signal detecting circuit for a digital controller for detecting a signal representing a quantity of system state necessary for control from an instantaneous value of an alternating current signal obtained from an instrument potential transformer or an instrument current transformer, which comprises:

an analog filter removing a direct current component and absorbing surges in a detected signal; and means for correcting the gain of the detected signal depending on the change in a detected frequency said means for correcting comprises means for correcting the gain of the detected signal using the standard electric power system frequency when the detected signal input from the instrument potential transformer or the instrument current transformer is lower than a constant value and correcting the gain of the detected signal corresponding to the change in the detected signal when the detected signal is higher than a constant value.

2. A signal detecting circuit for a digital controller for detecting a signal representative of a quantity of a system state necessary for controlling a generator connected to an electrical power system through a circuit from an instantaneous value of an alternating current signal obtained from an instrument potential transformer or an instrument current transformer connected to said generator, which comprises:

an analog filter removing a direct current component and absorbing surges in a detected signal; and means for correcting the gain of the detected signal depending on the change in a detected frequency; and said means for correcting comprises means for limiting an excessive frequency correction by providing a frequency limiter on a frequency detecting circuit to be in service while a circuit breaker is in a closed position.

3. A signal detecting circuit for a digital controller for detecting a signal representative of a quantity of a system state necessary for control from an instantaneous value of an alternating current signal obtained from an instrument potential transformer or an instrument current transformer, which comprises:

an analog filter removing a direct current component and absorbing surges in a detected signal;

means for correcting the gain of the detected signal depending on the change in a detected frequency; and means for correcting the phase delay of the detected signal having passed through said analog filter;

said frequency correcting means comprises means for correcting the gain of the detected signal using the standard electric power system frequency when the detected signal input from the instrument potential transformer or the instrument current transformer is lower than a constant value and correcting the gain of the detected signal corresponding to the change in the detected signal when the detected signal is higher than a constant value.

4. A signal detecting circuit for a digital controller for detecting a signal representative of a quantity of a system state necessary for controlling a generator connected to an electrical power system through a circuit from an instantaneous value of an alternating current signal obtained from an instrument potential transformer or an instrument current transformer connected to said generator, which comprises:

an analog filter removing a direct current component and absorbing surges in a detected signal;

means for correcting the gain of the detected signal depending on the change in a detected frequency; and means for correcting the phase delay of the detected signal having passed through said analog filter;

said frequency correcting means comprises means for limiting an excessive correction by providing a frequency limiter on a frequency detecting circuit to be in service while a circuit breaker is in a closed position.

5. A signal detecting circuit for a digital controller detecting a signal representative of a quantity of a system state necessary for control from an instantaneous value of an alternating current signal obtained from an instrument potential transformer or an instrument current transformer, which comprises:

an analog filter removing a direct current component and absorbing surges in a detected signal; and means for correcting the gain of the detected signal having passed through said analog filter corresponding to the change in a rotating speed of a generator.

6. A signal detecting circuit for a digital controller detecting a signal representative of a quantity of a system state necessary for control from an instantaneous value of an alternating current signal obtained from an instrument potential transformer or an instrument current transformer, which comprises:

an analog filter removing a direct current component and absorbing surges in a detected signal;

means for correcting the frequency of the gain of the detected signal having passed through said analog filter corresponding to a change in a rotating speed; and means for correcting the phase delay of the detected signal having passed through said analog filter.

* * * * *

UNITED STATES PATENT AND TRADEMARK OFFICE
CERTIFICATE OF CORRECTION

PATENT NO. : 5,594,350
DATED : 14 January 1997
INVENTOR(S) : Yutaka KOIZUMI et al.

It is certified that error appears in the above-indentified patent and that said Letters Patent is hereby corrected as shown below:

| Column | Line | |
|---|---|---|
| 2 | 64 | After "using" delete "a". |
| 6 | 59 | After "speed" insert --of a generator--. |

Signed and Sealed this

Nineteenth Day of August, 1997

Attest:

BRUCE LEHMAN

Attesting Officer

Commissioner of Patents and Trademarks